United States Patent
Fujita et al.

(10) Patent No.: US 7,234,872 B2
(45) Date of Patent: Jun. 26, 2007

(54) ROLLING BEARING

(75) Inventors: Yasunobu Fujita, Kanagawa (JP);
Masao Yamamoto, Kanagawa (JP);
Kouichi Hachiya, Kanagawa (JP);
Atsushi Yokouchi, Kanagawa (JP);
Toshikazu Yabe, Kanagawa (JP);
Emiko Shiraishi, Kanagawa (JP);
Michiharu Naka, Kanagawa (JP)

(73) Assignee: NSK, Ltd., Tokyo (JP)

( * ) Notice: Subject to any disclaimer, the term of this patent is extended or adjusted under 35 U.S.C. 154(b) by 1037 days.

(21) Appl. No.: 10/158,171

(22) Filed: May 31, 2002

(65) Prior Publication Data

US 2003/0081871 A1    May 1, 2003

Related U.S. Application Data

(63) Continuation-in-part of application No. 10/051,070, filed on Jan. 22, 2002, now Pat. No. 6,880,978.

(30) Foreign Application Priority Data

Jun. 6, 1997  (JP) ................................ P.9-149403

(51) Int. Cl.
*F16C 33/66* (2006.01)

(52) U.S. Cl. ...................................... 384/462

(58) Field of Classification Search ................. 384/462, 384/464, 470, 473, 474
See application file for complete search history.

(56) References Cited

U.S. PATENT DOCUMENTS 5,575,569 A * 11/1996 Shinohara .................... 384/470

FOREIGN PATENT DOCUMENTS

JP       08-200372 A      8/1996
JP       09-133137 A      5/1997

* cited by examiner

*Primary Examiner*—Lenard A. Footland
(74) *Attorney, Agent, or Firm*—Sughrue Mion, PLLC (57) ABSTRACT

A rolling bearing includes a plurality of rolling elements movably retained at almost the same interval between an inner ring and an outer ring with a cage made of synthetic resin provided interposed therebetween. The rolling bearing further includes, an oil film made of a lubricant, and a grease containing a synthetic oil as a base oil enclosed therein. The lubricant contains at least one additive selected from the group consisting of organic aliphatic acid, organic aliphatic acid derivative and organic phosphorus compound incorporated in a synthetic oil in a proportion of from 0.5 to 10% by weight formed on the surface of the raceways of the inner and outer rings and the surface of the rolling elements, and a grease containing a synthetic oil as a base oil enclosed therein.

11 Claims, 2 Drawing Sheets

ROLLING BEARING

This is a continuation-in-part application of U.S. application Ser. No. 10/051,070 filed on Jan. 22, 2002 now U.S. Pat. No. 6,880,978.

BACKGROUND OF THE INVENTION

The present invention relates to a rolling bearing and more particularly to a rolling bearing which exhibits excellent bearing rotary properties, suppressed fretting abrasion even upon repeated rocking motion due to external vibration during transportation and a drastically improved acoustic durability when used in a spindle, which is one of the constituent components of various motors for data recording device, household electric appliances, etc.

As lubricants or greases to be enclosed in a rolling bearing for spindle motor for data recording devices in computer or household electric appliances there have been developed various compounds depending on their purposes. In recent years, development has been made aiming at the reduction of torque meeting the demand for energy saving and the improvement of acoustic durability for improving the reliability.

Since data recording devices, household electric appliances, etc. are normally transported by truck with a rolling bearing mounted thereon, the rolling bearing is often subject to repeated rocking during transportation that causes fretting abrasion. Thus, rolling bearings have been also required to have an excellent fretting abrasion resistance.

SUMMARY OF THE INVENTION

The invention has been worked out in the light of these circumstances. It is an object of the present invention to provide a rolling bearing having an excellent fretting abrasion resistance in addition to further reduction of torque.

As described in the specification of U.S. application Ser. No. 10/051,070 filed on Jan. 22, 2002, the entire contents of which are incorporated herein, a rolling bearing accomplishing this object is disclosed having with an excellent fretting abrasion resistance in addition to further reduction of torque.

This object can also be accomplished by the use of other lubricants. This may include, among other things, a lubricating oil with additives and/or grease. In particular, the foregoing object can also be accomplished with a rolling bearing according to the invention comprising a plurality of rolling elements movably retained at almost the same interval between an inner ring and an outer ring with a cage made of synthetic resin provided interposed therebetween, an oil film made of a lubricant comprising at least one additive selected from the group consisting of organic aliphatic acid, organic aliphatic acid derivative and organic phosphorus compound incorporated in a synthetic oil in a proportion of from 0.5 to 10% by weight formed on the surfaces of the raceways of the inner and outer rings and the surface of the rolling elements and a grease comprising a synthetic oil as a base oil enclosed therein.

In the rolling bearing of the invention, the organic phosphoric acid compound which is an additive forms a protective layer for iron phosphate on the surface of a metal to act to improve resistance to fretting abrasion due to external vibration. The organic aliphatic acid and derivative thereof can make efficient dispersion of finely divided abrasive particles generated due to metallic contact during the initial stage of rotation of rolling bearing and improve resistance to abrasion, making it possible to maintain good acoustic properties over an extended period of time. On the other hand, the synthetic oil exhibits a reduced dynamic viscosity and an excellent adhesion to metal and thus can easily reach the surface of the rolling surface and sliding surface and maintains stably as a film to help the foregoing additive to attain its effect extremely effectively.

DETAILED DESCRIPTION OF THE PREFERRED EMBODIMENTS

The rolling bearing of the invention will be further described in connection with the attached drawings.

Figure 1:
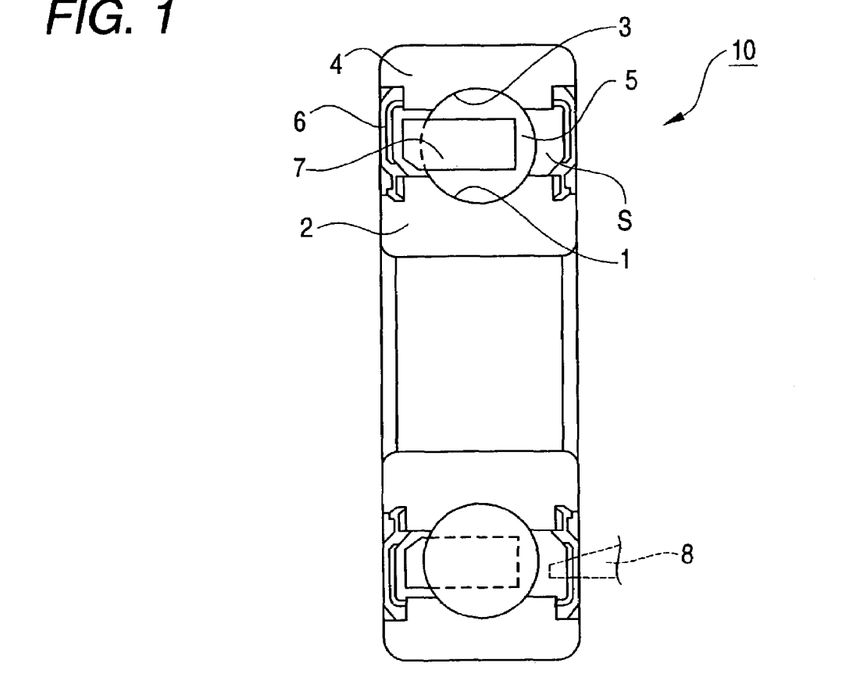
FIG. 1 is a sectional view illustrating a ball bearing which is an embodiment of the rolling bearing of the invention.

In the invention, the structure of the rolling bearing itself is not limited. For example, the rolling bearing of the invention may be a ball bearing 10 shown in FIG. 1. In some detail, the ball bearing 10 comprises a plurality of balls 5 as rolling elements movably retained at almost the same interval between an inner ring 2 and an outer ring 4 with a cage 7 interposed therebetween, a grease (not shown) enclosed in a bearing space S defined by the inner ring 2, the outer ring 4 and the ball 5, and a seal 6 for sealing the bearing space S. However, the cage 7 is made of a synthetic resin. In the invention, an oil film (not shown) made of a lubricant composition described below is formed on the raceways 1 and 3 of the inner and outer rings and the surface of the balls 5.

As the base oil for lubricant composition there is used a synthetic oil. In particular, a carboxylic acid ester compound represented by the following general formula (I) is preferred.

$$R_1O\text{—}CO\text{—}OR_2 \tag{I}$$

wherein $R_1$ and $R_2$ each independently represent a $C_6$–$C_{30}$ saturated or unsaturated straight-chain or branched alkyl group. The branched alkyl group is preferably one represented by the following general formula (II):

$$\text{—}CH_2CHR_3R_4 \tag{II}$$

wherein $R_3$ represents a $C_1$–$C_7$ saturated straight-chain alkyl group, and $R_4$ represents a $C_4$–$C_{12}$ saturated straight-chain alkyl group. Particularly preferred among these branched alkyl groups is one wherein the sum of the number of carbon atoms in $R_3$ and $R_4$ is from 11 to 13.

Examples of the synthetic oil which can be used preferably include diester oil obtained by the reaction of dibasic acid with branched alcohol, aromatic ester oil obtained by the reaction of aromatic ester-based tribasic acid with branched alcohol, and hindered ester oil obtained by the reaction of monobasic acid with polyvalent alcohol.

Examples of the diester oil include dioctyl adipate (DOA), diisobutyl adipate (DIBA), dibutyl adipate (DBA), dioctyl azelate (DOZ), dibutyl sebacate (DBS), dioctyl sebacate (DOS), and methyl acetyl ricinoleate (MAR-N).

Examples of the aromatic ester oil include trimellitic acid ester, trioctyl trimellitate (TOTM), tridecyl trimellitate, and tetraoctyl pyromellitate.

As the hindered ester oil there may be used one obtained by proper reaction of the following polyvalent alcohol and monobasic acid. One or more of these monobasic acids may be used. The hindered ester oil may be an oligoester of a polyvalent alcohol with a mixture of dibasic acid and monobasic acid as a complex ester.

Examples of the polyvalent alcohol include trimethylol propane (TMP), pentaerythritol (PE), dipentaerythritol (DPE), neopentyl glycol (NPG), and 2-methyl-2-propyl-1, 3-propane (MPPD).

As the monobasic acid there may be mainly used a $C_4$–$C_{18}$ monovalent aliphatic acid. Specific examples of the $C_4$–$C_{18}$ monovalent aliphatic acid include acetic acid, valeric acid, caproic acid, caprylic acid, enanthic acid, pelargonic acid, capric acid, undecanoic acid, lauric acid, myristic acid, palmitic acid, beef tallow acid, stearic acid, caproleic acid, undecylic acid, linderic acid, tudulanic acid, fiseteric acid, myristoleic acid, palmitoleic acid, petroceric acid, oleic acid, elaidic acid, ascrebic acid, vaccenic acid, sorbic acid, linoleic acid, linolenic acid, sabinic acid, and ricinoleic acid.

Preferred among these ester-based synthetic oils are carboxylic acid ester oil and polyolester oil. This is because carboxyl acid ester oil and polyolester oil can meet the requirements that when the rolling bearing is required to have improved resistance to fretting abrasion and reduced torque during transportation, the base oil of the lubricant composition have a reduced dynamic viscosity (reduced torque) and a good adhesion to the raceways of the bearing and the rolling surface and sliding surface of the rolling element to rapidly form a thin film thereon and hence enhance the abrasion resistance thereof.

The synthetic oil preferably has a dynamic viscosity of from 15 to 150 mm$^2$/s at 40° C. When the dynamic viscosity of the synthetic oil falls below 15 mm$^2$/s at 40° C., the resulting oil film exhibits a reduced strength that causes fretting abrasion. On the contrary, when the dynamic viscosity of the synthetic oil exceeds 150 mm$^2$/s at 40° C., the resulting viscosity resistance rises to increase rotary torque. Further, in order to use the effect of the additives described below as well so that abrasion during operation of bearing can be inhibited to improve torque, a synthetic oil having a dynamic viscosity of not higher than 70 mm$^2$/s at 40° C. is more desirable.

Further examples of the synthetic oil employable herein include synthetic hydrocarbon oils such as ether oil and poly-α-olefin. Examples of the ether oil include alkyl polyphenyl ether oil having a $C_{12}$–$C_{20}$ (di)alkyl chain such as diphenyl, triphenyl and tetraphenyl incorporated therein. As the synthetic hydrocarbon oil there may be used a co-oligomer synthetic oil obtained by reaction with α-olefin or ethylene.

These synthetic oils may be properly mixed for use.

The synthetic oil comprises at least one of the group of additives consisting of organic aliphatic acid, organic aliphatic acid derivative and organic phosphorus compound incorporated therein.

Preferred examples of the organic aliphatic acid and derivative thereof include oleic acid, naphthenic acid, abietic acid (resin acid), lanolinaliphatic acid, succinic acid, amino acid, and derivatives thereof. Preferred among the organic aliphatic acid derivatives is succinic acid compound. This is because the succinic acid compound fairly adheres to the rolling surface and sliding surface of the metal material to form a thin film thereon even when subject to effect of water content in the air or water content from sweating. As such a succinic acid compound there may be used alkylsuccinic acid, alkylsuccinic acid halfester, alkenylsuccinic acid, alkenylsuccinic acid halfester, succinic acid imide or the like besides succinic acid. These succinic acid compounds may be used singly or in proper combination.

As the organic phosphoric acid compound there is preferably used a phosphite. This is because the phosphite forms a reactive thin film excellent in extreme-pressure properties and abrasion resistance on the rolling surface or sliding surface. A preferred example of the phosphite is a phosphite of $C_1$–$C_{18}$ hydrocarbon (e.g., alkyl, phenyl, benzyl, cresyl, cinnamyl, allyl). Specific examples of such a phosphite include trioctyl phosphite, triphenyl phosphite, tricresyl phosphite, bis-2-ethylhexyl phosphite, tridecyl phosphite, dibutylhydrogen phosphite, tris(nonylphenyl) phosphite, dilaurylhydrogen phosphite, diphenylmonodecyl phosphite, trilauryltrithio phosphite, and diphenylhydrogen phosphite.

Alternatively, a phosphate may be used. A preferred example of the phosphate is a phosphate of $C_1$–$C_{18}$ hydrocarbon (e.g., alkyl, phenyl, benzyl, cresyl, cinnamyl, allyl). Specific examples of such a phosphate include triphenyl phosphate, triethyl phosphate, tributyl phosphate, tris(2-ethylhexyl) phosphate, tridecyl phosphate, diphenyl mono (2-ethylhexyl) phosphate, tricresyl phosphate, trioctyl phosphate, and tristearyl phosphate.

Further, an acidic phosphate may be used. A preferred example of the acidic phosphate is a $C_1$–$C_{20}$ mono- or dihydrocarbyl acid phosphate. Specific examples of such an acid phosphate include methyl acid phosphate, isopropyl acid phosphate, butyl acid phosphate, 2-ethylhexyl acid phosphate, isodecyl acid phosphate, tridecyl acid phosphate, and lauryl acid phosphate.

The amount of the foregoing organic aliphatic acid, organic aliphatic acid derivative and organic phosphorus compound to be added are each from 0.5 to 10% by weight based on the total amount of the lubricant composition. When the amount of these additives to be added each fall below 0.5% by weight, the reactive film cannot be uniformly and sufficiently formed on the rolling surface, making it impossible to attain sufficiently desired fretting abrasion resistance and abrasion resistance. In order to attain sufficient fretting abrasion resistance, it is preferred that these additives be each added in an amount of not lower than 1.5% by weight. Referring to the upper limit, even when these additives each are added in an amount of greater than 10% by weight, the resulting fretting abrasion resistance is saturated. Further, corrosion can easily occur on the rolling surface. Taking into account the counter result developed by excessive addition of these additives, a particularly preferred range of the amount of these additives are each from 1.5 to 6.0% by weight.

These organic aliphatic acids, organic aliphatic acid derivatives and organic phosphorus compounds may be used singly. However, these organic aliphatic acids, organic aliphatic acid derivatives and organic phosphorus compounds may be used in combination to exert a synergistic effect. In this case, the mixing proportion is preferably from 1:1 to 1:3. If these additives are used in combination, the total added amount of these additives needs to fall within the above defined range.

The thickness of the oil film made of the foregoing lubricant composition is not specifically limited. Further, the process for the formation of the oil film is not specifically limited. For example, however, a process is simple and desired which comprises dipping the rolling bearing in a solution obtained by diluting the lubricant composition with a volatile solvent such as hexane, withdrawing the rolling bearing from the solution, and then allowing the volatile solvent to evaporate away from the rolling bearing. This process allows the formation of an oil film to the above defined thickness.

The rolling bearing of the invention comprises the following grease enclosed therein.

As the base oil for the grease there may be used properly selected from the synthetic oils to be used in the oil film. The base oil may be the same or different from the synthetic oil used in the oil film.

As a thickening agent to be incorporated in the grease there is preferably used a lithium soap. Preferred among these lithium soaps are lithium stearate and lithium 12-hydroxystearate. In particular, lithium stearate is advantageous in that it softens when subject to shearing force on the rolling surface of the rolling bearing and can easily adhere to the raceways of the inner and outer rings and the surface of the rolling elements to form a lubricant film on the rolling surface, improving fretting resistance and abrasion resistance and reducing torque. The amount of the thickening agent to be added is not specifically limited so far as the resulting grease can be provided with a proper consistency. In practice, however, it is preferably from 5 to 25% by weight based on the total amount of the grease composition.

Similarly to the lubricant composition constituting the oil film, the grease composition may comprise at least one of the group of additives consisting of organic aliphatic acid, organic aliphatic acid derivative and organic phosphorus compound incorporated therein to have enhanced fretting abrasion resistance and abrasion resistance. The amount of these additives to be incorporated in the grease composition are each from 0.5 to 10% by weight. However, the grease composition may not be the same as the lubricant composition if the amount of these additives fall within the above defined range.

The amount of the grease to be enclosed in the rolling bearing is preferably in the range of from 5 to 25 vol-% of the bearing space S.

EXAMPLES

The invention will be further described in the following examples.

The test lubricants, test greases and test additives used in the examples are set forth in Tables 1A, 2A and 3A, respectively.

TABLE 1A

| | Test lubricant | | | |
|---|---|---|---|---|
| | Base lubricant I | Base lubricant II | Base lubricant III | Base lubricant IV |
| Kind of lubricant | A | B | A + B (50:50) | C |

TABLE 1A-continued

| | Test lubricant | | | |
|---|---|---|---|---|
| | Base lubricant I | Base lubricant II | Base lubricant III | Base lubricant IV |
| Dynamic viscosity mm$^2$/s (40° C.) | 19 | 26 | 21 | 12 |

A: Carboxylic acid ester oil;
B: Polyolester oil;
C: Dioctyl sebacate oil

TABLE 2A

| | Test grease | | |
|---|---|---|---|
| | Base grease I | Base grease II | Base grease III |
| Thickening agent | E | E | F |
| Base oil | A | A + B | D + C (80:20) |
| Worked penetration | 301 | 298 | 250 |

D: Polyolester oil (133 mm$^2$/s (40° C.));
E: Lithium stearate;
F: Lithium 12-hydroxystearate

TABLE 3A

| | Test additive | |
|---|---|---|
| | G | H |
| Name of additive | Alkenylsuccinic anhydride | Phosphite |
| Kind of additive | Organic aliphatic acid | Organic phosphorus compound |
| Maker | Nisseki Kagaku K.K. | Jouhoku Kagaku Kogyo K.K. |
| Trade name | MSP | JP2246 |

Example 1A

Figure 2:
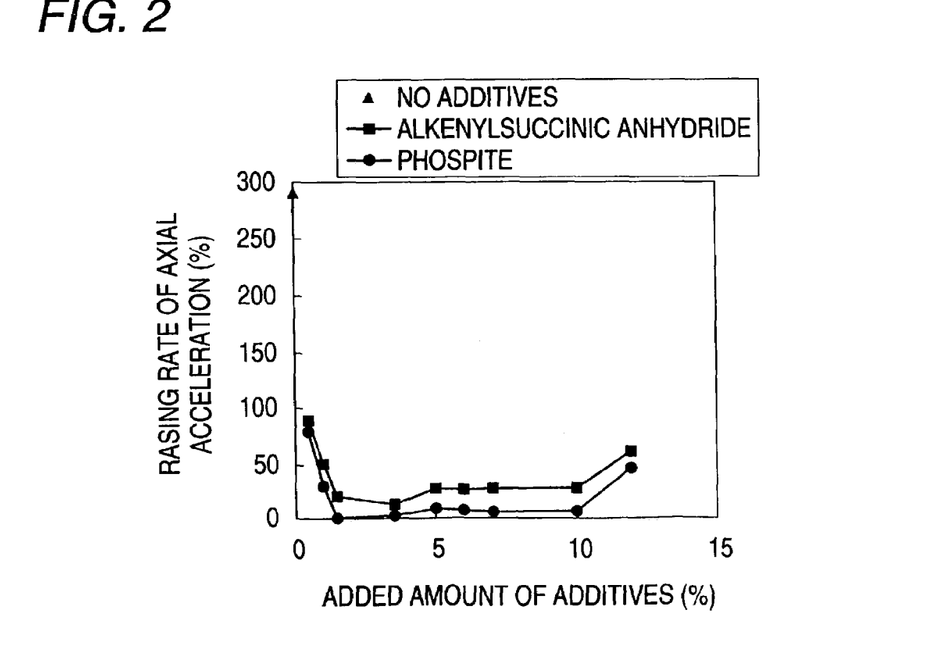
FIG. 2 is a graph illustrating the relationship between the added amount of the additives and the rise of axial acceleration obtained in Example 1.

The base lubricant I set forth in Table 1A and the base grease I set forth in Table 2A were used. To these materials were then added the test additives G and H set forth in Table 3A in different amounts to prepare a lubricant composition and a sealing grease. The amount of the additive to be added to the lubricant composition and the sealing grease were the same. For comparison, a lubricant composition free of additives and a sealing grease free of additives were prepared. As a testing bearing there was used B4-50A (inner diameter: 4 mm; outer diameter: 9 mm; width: 2.6 mm) (produced by NSK Ltd.). The testing bearing was dipped in a solution obtained by diluting the lubricant composition with hexane to a concentration of 5 vol-%, and then withdrawn from the solution so that hexane was allowed to evaporate to form an oil film. Subsequently, the testing bearing having an oil film formed thereon was filled with 2.35 mg of the sealing grease to prepare a test bearing. The test bearing was mounted on HDD spindle where it was then aged at a temperature of 70° C. for 2 hours. The test bearing was rocked 100,000 times at room temperature, a rocking angle of 4° and a rocking frequency of 9 Hz under an axial load of 14.7 N. The axial acceleration was then compared from before to after rocking test. The resulting increase of axial acceleration was then used to evaluate fretting abrasion resistance. The relationship between the added amount of the various additives and the rise of axial acceleration is shown in FIG. 2. The rise of axial acceleration was calculated by the following equation:

(Measured value after test−measured value before test)×100/measured value before test (%)

As can be seen in FIG. 2, the addition of both the two additives each in an amount of from 0.1 to 10% by weight, particularly from 1.5 to 6% by weight, makes it possible to improve fretting abrasion resistance.

Example 2A

Figure 3:
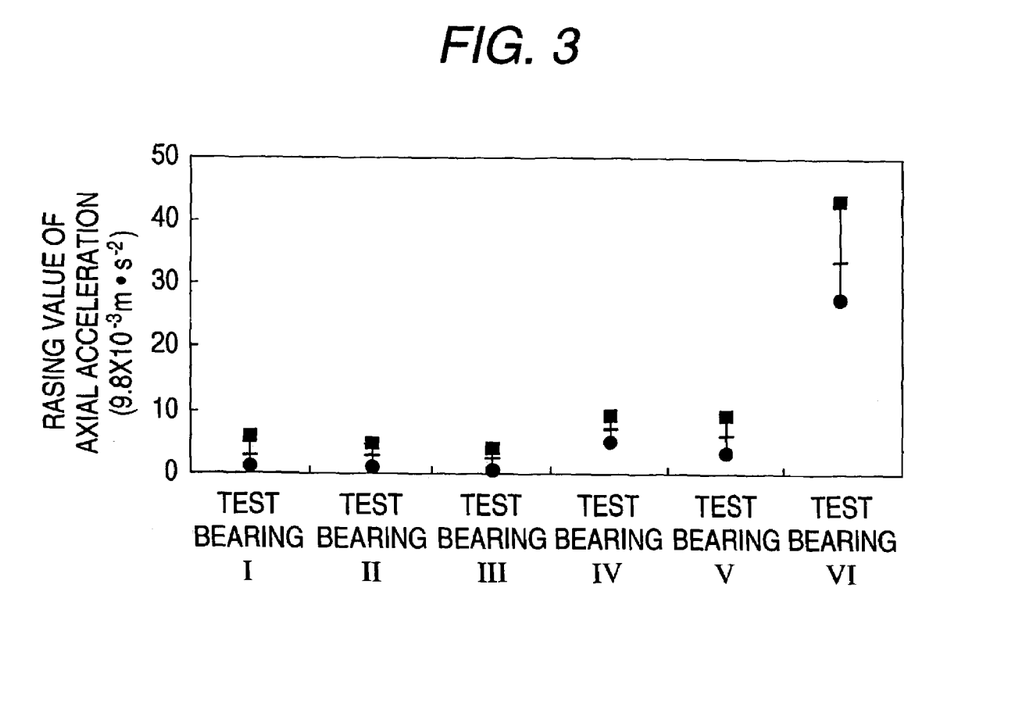
FIG. 3 is a graph illustrating the change of rise of axial acceleration with the mixing proportion of additives or with the presence or absence of additives as obtained in Example 2.

As shown in Table 4A, the base lubricant set forth in Table 1A, the base grease set forth in Table 2A and the additive set forth in Table 3A were combined to prepare lubricant compositions and sealing greases. The same testing bearing as used in Example 1A was dipped in solutions obtained by diluting the lubricant compositions with hexane to a concentration of 5 vol-%, and then withdrawn from the solution so that hexane was allowed to evaporate to form an oil film thereon. The testing bearings were each then filled with 2.35 mg of the sealing grease to prepare test bearings I to VI. These test bearings were each then subjected to fretting test in the same manner as in Example 1A. The rise of axial acceleration on the single bearing from before to after test was then measured. The results of evaluation are shown in FIG. 3.

TABLE 4A

Specification of test bearings

| Test bearing | Base lubricant | Base grease | Additives |
|---|---|---|---|
| Test bearing I | Base lubricant I | Base grease I | G:2.5%, H:2.5% |
| Test bearing II | Base lubricant I | Base grease II | G:1.0%, H:3.0% |
| Test bearing III | Base lubricant II | Base grease I | G:0%, H:5.0% |
| Test bearing IV | Base lubricant III | Base grease I | G:3.0%, H:1.0% |
| Test bearing V | Base lubricant I | Base grease III | G:3.5%, H:2.5% |
| Test bearing VI | Base lubricant IV | Base grease III | None |

As can be seen in FIG. 3, the incorporation of these additives makes it possible to improve fretting abrasion resistance.

Example 3A

Figure 4:
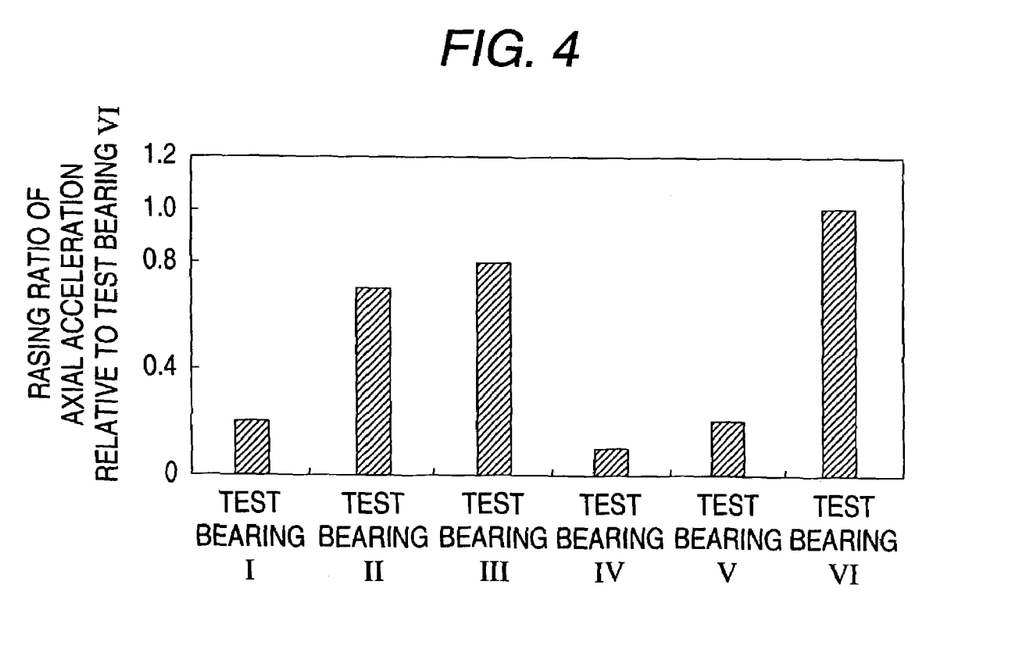
FIG. 4 is a graph illustrating the change of rise of axial acceleration with the mixing proportion of additives or with the presence or absence of additives as obtained in Example 3.

The test bearings I to VI were used as in Example 2. These test bearings I to VI were each subjected to durability test at 70° C., 4,200 $min^{-1}$ and an axial load of 14.7 N for 500 hours. The rise of axial acceleration from before to after test was then measured. FIG. 4 shows the results of these measurements relative to the value of the test bearing VI.

As can be seen in FIG. 4, the incorporation of these additives makes it possible to improve fretting abrasion resistance.

As can be seen in the results of Examples 2A and 3A, the test bearing I, which comprises a lubricant composition and a sealing grease having both the two additives incorporated therein in the same amount, is comprehensively excellent.

Hereinafter, the rolling bearing for HDDs according to the other embodiments of the present invention will be described in detail. The rolling bearings according to the other embodiments is used for hard disk drives (hereinafter referred to simply as HDD), in particular, rolling bearings appropriately employed in HDD components with rocking motion such as actuators (in particular, swing arms) or high-speed rotary motion such as spindles.

The rolling bearing for HDDs of the other embodiment of the present invention is characterized in that a lubricant such as a lubricating oil is injected, into the bearing space of a rolling bearing for HDDs as shown in FIG. 5. The bearing space S between the sealing members 6,6 at the both ends in the axial direction means the space between the sealing members 6, 6 at the both ends in the axial direction of the inner ring 2 or the outer ring 4. Thus, the space among the rolling balls 5 and the cage 7 is excluded therefrom.

It is preferable that the lubricant, such as the lubricating oil is injected into the bearing space so as to amount to 1 to 50% by volume of the space. When the content of the lubricating oil is less than 1% by volume, there arise some problems, for example, insufficient thickness of the lubricating oil film or early dry-up of the lubricating oil. When the lubricating oil is injected in an amount exceeding to 50% by volume, on the other hand, the lubricating oil frequently leaks out, though the lubricating life can be prolonged in this case.

It is desirable that the amount of the lubricant such as the lubricating oil to be injected is appropriately determined within the range as defined above depending on the component into which the bearing is to be put.

In a rolling bearing employed in a high-speed rotary component such as a spindle or a swing arm, from among those to be put into HDDs, namely, it is preferable to inject the lubricant such as the lubricating oil in a larger amount from the viewpoints of the heat resistance and high-speed rotary performance of the outer ring 4. In this case, it is preferable to inject the lubricant such as a lubricating oil in a large amount up to 50% by volume. In a rolling bearing employed in a component with reciprocating rocking motion such as a swing arm, on the other hand, excessively high heat resistance and high-speed rotary performance are unnecessary. In this case, it is enough to inject the lubricant, such as the lubricating oil in an amount of 30% by volume or less, preferably from 4 to 25% by volume.

Although the method of injecting the lubricant, such as the lubricating oil is not particularly restricted, it is needed to utilize a method capable of controlling the amount of the injection. For example, the sealing member 6 is preliminarily put into the lower part of the bearing and then fixed to one end in the axial direction of the outer ring 4. Next, nozzles 8, in the same number as that of the pockets in the cage 7, are put downward thereon and the lubricating oil is uniformly injected from the nozzles in a predetermined amount into the bearing. Then the sealing member 6 is put in and fixed to another end of the outer ring 4.

By using this injection method, a large amount of the lubricating oil can be encapsulated in the position to be lubricated in the bearing, thus ensuring the formation of thick lubricating oil films, compared with the conventional method wherein a bearing is immersed in a lubricating oil. Further, the lubricating oil does not adhere to the outer surface of the bearing and, therefore, no procedure for wiping the lubricating oil is needed, different from the conventional method wherein a bearing is immersed in a lubricating oil. Thus the working efficiency can be highly elevated. Since the outside of the bearing is absolute dry, there is no fear that the lubricating oil might stain recording media in the HDD.

When the cage 7 preliminarily containing the lubricating oil is put into the bearing, the lubricating oil would ooze out onto the surface of the cage 7 as the bearing rotates. Thus the lubricating oil is continuously supplied to the lubricant face for a long time and thus the lubricating life is prolonged.

It is preferable to determine the content of the lubricating oil in the cage 7 depending on the component into which the bearing is to be put. The lubricating oil contained in the cage 7 is excluded from the lubricating oil to be injected into the bearing space. The lubricating life can be prolonged while the mechanical strength of the cage is lowered with an increase in the lubricating oil content in the cage 7. In the case of a rolling bearing to be used in a high-speed rotary component such as a spindle wherein mechanical strength of a certain degree is needed, it is therefore preferable to maintain the mechanical strength at the desired level by regulating the lubricating oil content. In such a case, it is preferable that the upper limit of the lubricating oil content is 40% by weight based on the weight of the cage 7. In the case of a rolling bearing to be used in a reciprocating rocking component such as a swing arm wherein the mechanical strength may not be so high, the lubricating oil content can be elevated so as to prolong the lubricating life. In such a case, the lubricating oil content may be up to 80% by weight, preferably from 10 to 70% by weight. In each case, the lower limit of the lubricating oil content is 0.1% by weight. When the lubricating oil content is less than 0.1% by weight, the lubricating oil is supplied from the cage 7 only in an excessively small amount and thus cannot contribute to the lubrication of the lubricant faces.

The lubricating oil may be introduced into the cage 7 by immersing the cage 7 in the lubricating oil, kneading a resin together with the lubricating oil followed by molding, etc. When the lubricating oil content is 3% by weight or less, it is convenient to immerse the cage 7 in the lubricating oil. When the lubricating oil is to be introduced thereinto in a larger amount, it is convenient to use the latter method. In this case, it should be taken into consideration that the capability of the resin, of which the cage 7 is made, of holding the lubricating oil varies depending on the type of the resin or the combination of the resin with the lubricating oil.

The sealing members 6,6 fixed to the both ends in the axial direction of the inner ring 2 may be opposite to the outer ring 4. Either a contact seal or a non-contact one may be used as the sealing members 6,6. The rolling elements may be rollers.

Although the lubricant such as the lubricating oil is not particularly restricted, use of lubricating oils composed of the base oils with various additives as will be described hereinbelow makes it possible to obtain lubricant compositions being excellent in fretting wear resistance, heat resistance and high-speed rotary performance, thus achieving the object of the present invention.

When the lubricating properties and heat resistance and solubility of additives are taken into consideration, it is preferable that the base oil contain ester oils. Although the ester oils are not particularly restricted, preferable examples thereof include diester oils obtained by reacting a dibasic acid with a branched alcohol, aromatic ester oils obtained by reacting an aromatic acid basic acid with a branched alcohol and hindered ester oils obtained by reacting a polyhydric alcohol with a monobasic acid. From the viewpoint of low volatility for preventing recording media in HDDs from stains, it is preferable to use one selected from among aromatic ester oils, hindered ester oils and mixtures thereof.

Examples of the diester oils include dioctyl adipate (DOA), diisobutyl adipate (DIBA), dibutyl adipate (DBA), dioctyl azelate (DOZ), dibutyl sebacate (DBS), dioctyl sebacate (DOS) and methyl acetyl ricinoleate (MAR-N).

Examples of the aromatic ester oils include trimellitate, pyromellitiate, trioctyltrimellitate (TOTM), tridecyltrimellitate and tetraoctylpyromellitate.

Examples of the hindered ester oils include those obtained by reacting a polyhydric alcohol with a monobasic acid, each as will be shown hereinbelow. Either one or more monobasic acids may be reacted with a polyhydric alcohol. Also, use may be made of complex esters which are oligoesters of polyhydric alcohols with mixed fatty acids comprising dibasic acids with monobasic acids.

Examples of the polyhydric alcohols include trimethylolpropane (TMP), pentaerythritol (PE), dipentadrythritol (DPE), neopentyl glycol (NPG) and 2-methyl-2-propyl-1,3-propane (MPPD).

As the monobasic acids, monovalent $C_{4-18}$ fatty acids are mainly employed. Particular examples thereof include acetic acid, valerianic acid, caproic acid, caprylic acid, enanthic acid, pelargonic acid, undecanoic acid, lauric acid, caprylic acid, myristic acid, palmitic acid, beef tallow fatty acids, stearic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, sorbic acid, linolic acid, linolenic acid, sabinic acid and ricinoleic acid.

Such ester oil amounts at least to 20% by weight of the base oil. When the lubricating properties are taken into consideration, it is preferable that the ester oil contains at least 40% by weight of pentaerythritol ester, dipentaerythritol ester or a mixture thereof.

When the content of the ester oil is less than 20% by weight, no sufficient fretting wear resistance (lubricating properties) can be achieved. The upper limit thereof is not particularly determined.

In addition to the above-mentioned ester oil, the base oil may further contain synthetic hydrocarbon oils, ether oils and mineral oils.

Examples of the synthetic hydrocarbon oils include poly-α-olefin oils and α-olefin/ethylene cooligomers.

Examples of the ether oils include phenyl ether oils obtained by introducing $C_{12-20}$ (di)alkyl chains into diphenyl, triphenyl or tetraphenyl. From the viewpoint of low volatility, (di)alkyl polyphenyl ether oils are preferable. Based on the specification on the above ester oil, these oils are contained in an amount -of not more than 80% by weight.

The base oil should have a kinematic viscosity of at least 30 mm$^2$/s under a temperature of 40° C. When its kinematic viscosity is less than 30 mm$^2$/s, sufficient film formation cannot be achieved during rotation and thus the bearing life is shortened. Although the upper limit of the kinematic viscosity is not particularly specified, the kinematic viscosity is to be not more than 400 mm$^2$/s, by considering the handling properties, oil film formation and increase in torque. To form an oil film having a sufficient fretting wear resistance, it is preferable that the kinematic viscosity ranges from 40 to 200 mm$^2$/s.

The durability of the lubricating oil film can be improved by adding rust proof agents, oily components, antioxidants, etc. thereto.

As the rust proof agents, it is preferable to use organic sulfonic acid metal salts or esters. Examples of the organic sulfonic acids include dinonylnapthalenesulfonic acid and heavy alkylbenzenesulfonic acids. Examples of metal salts thereof include calcium sulfonate, barium sulfonate and sodium sulfonate.

Examples of the sorbitan derivatives as esters include partial esters of polybasic carboxylic acids and polyhydric alcohols such as sorbitan monolaurate, sorbitan tristearate, sorbitan monooleate and sorbitan trioleate. Examples of the alkyl esters include polyoxyethylene laurate, polyoxyethylene oleate and polyoxyethylene stearate.

As the rust proof agent, use can be made of these organic sulfonic acid metal salts and esters either alone or as a mixture thereof.

Preferable examples of the oily components include higher fatty acids (oleic acid, stearic acid, etc.), higher alcohols (lauryl alcohol, oleyl alcohol, etc.), amines (stearylamine, cetylamine, etc.) and phosphates (tricresyl phosphate, etc.). These compounds may be employed either alone or as a mixture thereof.

As the antioxidants, it is preferable to use a mixture of a nitrogen-containing compound-based antioxidant with a phenol antioxidant or sulfur-based antioxidants.

Examples of the nitrogen-containing compound-based antioxidant include phenyl-α-naphthylamine, diphenylamine, phenylenediamine, oleylamidoamine and phenothiazine.

Examples of the phenol antioxidant include hindered phenols such as p-t-butyl phenyl salicylate, 2,6-di-t-butyl-p-phenylphenol, 2,2'-methylenebis(4-methyl-6-t-octylphenol), 4,4'-butylidenebis-6-t-but-yl-m-cresol, tetrakis[methylene-3-(3'-5'-di-t-butyl-4'-hydroxyphenyl)propionate] methane, 1,3,5-trimethyl-2,4,6-tris(3,5-di-t-butyl-4-hydroxybenzyl)benzene, n-octadecyl-β-(4'-hydroxy-3',5'-di-t-butylphenyl)propionate, 2-n-octyl thio-4,6-di(4'-hydroxy-3',5'-di-t-butyl)phenoxy-1,3,5-triazine, 4,4'-thiobis-[6-t-butyl-m-cresol], 2-(2'-hydroxy-3'-t-butyl-5'-methylphenyl)-5-chlorobenzotriazole.

In addition to these components, the lubricating oil may contain extreme pressure agents, viscosity index elevating agents, wear inhibitors, etc. which may be well known ones.

To further illustrate the present invention in greater detail, the following Examples and Comparative Examples will be given.

Examples 1 to 11 and Comparative Example 1

As Tables 1 to 3 show, definite additives (antioxidant, oily agent, etc.) were added to various base oils to thereby give lubricating oils. In these tables, each value given in brackets means the content (% by weight) of the component based on the whole lubricating oil. The additives were added so as to give a total content of 5% by weight based on the lubricating oil.

Then each lubricating oil was injected into the bearing space of a sample bearing [single row, deep groove ball bearing; non contact steel seal (model Z); No. SR1810, 7.94 mm (inner diameter)×12.7 mm (outer diameter)×3.97 mm (width)] to give the content (% by volume) specified in Tables 1 to 3. The lubricating oil was sealed by preliminarily putting a sealing member into the lower part of the bearing, injecting the lubricating oil in the definite amount, and then fixing the sealing member to one end. As the cage, use was made of one containing the same lubricating oil as the injected one in the amount as specified in Tables by immersion.

Each sample bearing thus formed was subjected to various tests as will be shown hereinbelow. Tables 1 to 3 also show the results of these tests.

(1) Rocking-Tolerance Test

This test was performed under the following conditions to evaluate the fretting wear resistance and durability (life) of each bearing.

| | |
|---|---|
| rocking frequency | 30 Hz |
| outer ring rocking angle | 8° |
| axial load | 29.4 N |
| number of repeated rocking | 5,000,000 |
| atmospheric temperature | ordinary. |

The rocking resistance was evaluated in the following manner. After the completion of the rocking durability test, each test bearing was decomposed and the conditions of the inner ring, outer ring and cage were observed. Samples showing no wear in the inner ring raceway surface, outer ring raceway surface and cage were expressed in "○" and those showing running traces in the inner ring raceway surface and outer ring raceway surface were expressed in "Δ". These samples were referred to as coming up to the standard. On the other hand, those showing wear in the inner ring raceway surface and outer ring raceway surface were expressed as "x" and referred to as failing to come up to the standard.

(2) Oil Leakage Test

Each sample bearing containing the lubricating oil injected therein was allowed to stand at 25 for 30 days and it was confirmed under a stereo-microscope whether the oil leaked out or not. Samples showing no leakage were expressed in "○" while those showing leakage were expressed in "x".

(3) Dusting Test

In a sealed container, the outer ring of each sample bearing was rotated at 7,200 rpm and the dusts thus formed were counted with an out particle counter. Dusts of 0.1 μm or above in particle size per 0.1 cf (cubic foot) were counted. Samples showing 150 or less dusts were expressed in "○" and referred to as coming up to the standard. On the other hand, those showing more than 150 dusts were expressed as "x" and referred to as failing to come up to the standard.

(4) Torque Test

The inner ring of each sample bearing was rotated at 2 rpm under an axial load of 9.8N. Then the torque required at the initial stage was measured and the change in the torque was monitored. Samples requiring an initial torque of not more than 1.0 gf·cm and showing a change in torque of 0.2 gf·cm or less were expressed in "○" and referred to as coming up to the standard. On the other hand, those exceeding these levels were expressed as "x" and referred to as failing to come up to the standard.

TABLE 1

| | Example 1 | Example 2 | Example 3 | Example 4 |
|---|---|---|---|---|
| Base oil | ester oil [95] | ester oil [95] | ester oil [95] | ester oil [95] |
| Kinematic viscosity of base oil [mm²/s 40° C.] | 32 | 32 | 32 | 32 |
| Amount of injected lubricant oil [vol %, based on bearing space] | 1 | 1 | 30 | 30 |
| Oil content in cage [wt. %] | 0.15 | 78 | 0.15 | 78 |
| Rocking resistance | Δ | Δ | ○ | ○ |
| Oil leakage | ○ | ○ | ○ | ○ |

TABLE 1-continued

|  | Example 1 | Example 2 | Example 3 | Example 4 |
|---|---|---|---|---|
| Dusting | ○ | ○ | ○ | ○ |
| Torque | ○ | ○ | ○ | ○ |

TABLE 2

|  | Example 5 | Example 6 | Example 7 | Example 8 |
|---|---|---|---|---|
| Base oil [95] | ester oil [95] | ester oil [95] | ester oil [95] | ester oil [95] |
| Kinematic viscosity of base oil [mm$^2$/s 40° C.] | 298 | 298 | 298 | 298 |
| Amount of injected lubricant oil [vol %, based on bearing space] | 1 | 30 | 1 | 30 |
| Oil content in cage [wt. %] | 0.15 | 0.15 | 78 | 78 |
| Rocking resistance | Δ | ○ | Δ | ○ |
| Oil leakage | ○ | ○ | ○ | ○ |
| Dusting | ○ | ○ | ○ | ○ |
| Torque | ○ | ○ | ○ | ○ |

TABLE 3

|  | Example 9 | Example 10 | Example 11 | C. Example 1 |
|---|---|---|---|---|
| Base oil | ester oil [95] PAO [15] | ester oil [90] ether oil [5] | ester oil [85] mineral oil [10] | Li grease |
| Kinematic viscosity of base oil [mm$^2$/s 40° C.] | 50 | 150 | 250 | 100 |
| Amount of injected lubricant oil [vol %, based on bearing space] | 10 | 30 | 20 | 10 |
| Oil content in cage [wt. %] | 15 | 30 | 20 | 10 |
| Rocking resistance | ○ | ○ | ○ | ○ |
| Oil leakage | ○ | ○ | ○ | ○ |
| Dusting | ○ | ○ | ○ | ○ |
| Torque | ○ | ○ | ○ | x |

As Tables 1 to 3 show, the test bearings of the examples of the present invention are each excellent in all of the items of rocking resistance, oil leakage, dusting and torque properties.

For comparison, the same tests were performed on a sample bearing having an Li grease lubricant injected into the bearing space to amount 10% by volume. As a result, this sample bearing achieved almost comparable results to those of the invention products in rocking resistance, oil leakage and dusting but inferior thereto in torque properties. This sample bearing is shown as Comparative Example 1 in Table 3.

Examples 12 to 18 and Comparative Example 2

As Tables 4 and 5 show, definite additives (antioxidant, oily agent, etc.) were added to various base oils to thereby give lubricating oils. In these tables, each value given in brackets means the content (% by weight) of the component based on the whole lubricating oil.

Then each lubricating oil was injected into the bearing space of a sample bearing [single row, deep groove ball bearing; non contact rubber seal (model V); No. SR695, 5 mm (inner diameter)×13 mm (outer diameter)×4 mm (width)] to give the content (% by volume) specified in Tables 4 and 5. The lubricating oil was sealed by preliminarily putting a sealing member into the lower part of the bearing, injecting the lubricating oil in the definite amount, and then fixing the sealing member to one end. As the cage, use was made of one containing the same lubricating oil as the injected one in the amount as specified in Tables by immersion.

Each sample bearing thus formed was subjected to various tests as will be shown hereinbelow. Tables 1 to 3 also show the results of these tests.

(5) Bearing Sound Test

This test was performed under the following conditions to evaluate the high-speed rotary performance and durability (life) of each bearing.
  bearing rotation rate: 12,000 rpm (outer ring)
  axial load: 2 kgf
  atmospheric temperature: 90° C.

The sound was measured by using an Andelon meter. The Andelon value immediately after the injection of the lubricating oil (initial Andelon) was compared with the Andelon value after continuously operating for 2,000 hours. Table 4 shows the results. Samples showing a ratio of 2.5 or less were referred to as coming up to the standard.

✪: 0.5 or less
◉: 0.6–1.0
○: 1.1–2.5
Δ: 2.6–5.0
x: more than 5.1.

(6) Oil Leakage Test

Each sample bearing containing the lubricating oil injected therein was allowed to stand at 25° C. for 30 days and it was confirmed under a stereo-microscope whether the oil leaked out or not. Samples showing no leakage were expressed in "○" while those showing leakage were expressed in "x".

(3) Dusting Test

In a sealed container, the outer ring of each sample bearing was rotated at 7,200 rpm and the dusts thus formed were counted with an out particle counter. Dusts of 0.1 μm or above in particle size per 0.1 cf (cubic foot) were counted. Samples showing 150 or less dusts were expressed in "○" and referred to as coming up to the standard. On the other hand, those showing more than 150 dusts were expressed as "x" and referred to as failing to come up to the standard.

TABLE 4

|  | Example 12 | Example 13 | Example 14 | Example 15 |
|---|---|---|---|---|
| Base oil | DOS [97.45] | DOS [97.45] | DOS [97.45] | PAO [85.95] |
| Additive | [2.55] | [2.55] | [2.55] | [14.05] |
| Kinematic viscosity of base oil [mm$^2$/s 40° C.] | 12 | 12 | 12 | 48 |
| Amount of injected lubricant oil [vol %, based on bearing space] | 3 | 3 | 3 | 25 |
| Oil content in cage [wt. %] | 0.1 | 1.2 | 40 | 0.1 |
| Sound property | ○ | ◉ | ¤ | ○ |
| Oil leakage | ○ | ○ | ○ | ○ |
| Dusting | ○ | ○ | ○ | ○ |

TABLE 5

|  | Example 16 | Example 17 | Example 18 | C. Example 2 |
|---|---|---|---|---|
| Base oil | DOS [18.09] PAO [72.36] | DOS [54.24] POE [36.16] | DOS [16.32] POE [10.88] PAO [63.25] | DOS [34.38] POE [51.57] |
| Additive | [9.55] | [9.6] | [9.55] | [14.05] |
| Kinematic viscosity of base oil [mm²/s 40° C.] | 100 | 70 | 150 | 70 |
| Amount of injected lubricant oil [vol %, based on bearing space] | 25 | 35 | 50 | 55 |
| Oil content in cage [wt. %] | 3 | 3 | 3 | 0.1 |
| Sound property | ¤ | ¤ | ¤ | ⊚ |
| Oil leakage | ○ | ○ | ○ | x |
| Dusting | ○ | ○ | ○ | x |

As Tables 4 and 5 show, the test bearings of the examples of the present invention are each excellent in all of the items of sound property, oil leakage and dusting properties. In contrast thereto, the sample bearing of Comparative Example 2 achieved almost comparable results to those of the invention products in sound property, but inferior thereto in oil leakage and dusting properties, since the lubricating oil had been injected thereinto in an amount exceeding the level as defined in the present invention.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As mentioned above, in accordance with the invention, an oil film made of a lubricant composition comprising at least one of the group of additives consisting of organic aliphatic acid compound, organic aliphatic acid derivative and organic phosphorus compound incorporated therein in an amount of from 0.5 to 10% by weight is formed on the raceways of the inner and outer rings and the surface of the rolling elements and a grease comprising a synthetic oil as a base oil is enclosed in the rolling bearing, making it possible to provide a rolling bearing having an excellent fretting abrasion resistance in addition to further reduction of torque and improvement of rotary properties such as acoustic durability.

Further, as discussed above, in particularly, when the lubricating oil is injected into the bearing space to as to amount to 4 to 25% by volume of the bearing space, the lubricating effect would not disappear early.

What is claimed is:

1. A rolling bearing comprising:
   an inner ring having an inner ring raceway;
   an outer ring having an outer ring raceway;
   a plurality of rolling elements rotatably disposed between the inner ring raceway and the outer ring raceway, each of the rolling elements having a rolling surface;
   a retainer rotatably retaining the rolling elements;
   an oil film made of a lubricant comprising at least one additive selected from the group consisting of organic aliphatic acid, organic aliphatic acid derivative and organic phosphorus compound incorporated in a first synthetic oil in a proportion of from 0.5 to 10% by weight,
   wherein the oil film is formed on at least one of the inner ring raceway, the outer ring raceway and the rolling surface; and
   a grease comprising a second synthetic oil as a base oil enclosed therein.

2. The rolling bearing according to claim 1, wherein The lubricant contains the at least one additive incorporated in the synthetic oil in a proportion of from 1.5 to 6% by weight.

3. The rolling bearing according to claim 2, wherein the first synthetic oil has a dynamic viscosity of from 15 to 150 mm²/s at 40° C.

4. The rolling bearing according to claim 3, wherein the first synthetic oil has the dynamic viscosity of 70 mm²/s at 40° C.

5. The rolling bearing according to claim 1, wherein the amount of the grease is not more than 25% by volume of a bearing space defined between the inner and outer rings.

6. The rolling bearing according to claim 5, wherein the amount of the grease is not less than 5% by volume of the bearing space.

7. The rolling bearing according to claim 1, wherein the first synthetic oil has a dynamic viscosity of from 15 to 150 mm²/s at 40° C.

8. The rolling bearing according to claim 7, wherein the first synthetic oil has the dynamic viscosity of 70 mm²/s at 40° C.

9. The rolling bearing according to claim 1, wherein the second synthetic oil is the same as the first synthetic oil.

10. A rolling bearing comprising:
    an inner ring having an inner ring raceway;
    an outer ring having an outer ring raceway;
    a plural number of rolling elements located between said inner ring and said outer ring;
    a cage supporting said plural number of rolling elements;
    a pair of sealing members fixed to both ends in an axial direction of one of said inner ring and said outer ring and disposed opposite to each other; and
    a lubricant contained in a to-be-sealed bearing space defined between said sealing members at the both ends in the axial direction,
    wherein the amount of the lubricant is not more than 25% by volume of a bearing space of the rolling bearing;
    wherein said lubricant is a grease comprising a synthetic oil as a base oil enclosed therein, wherein said rolling bearing further includes an oil film that is formed on at least one of the inner ring raceway, the outer ring raceway and the rolling surface, and wherein said oil film is made of a lubricant comprising at least one additive selected from the group consisting of organic aliphatic acid, organic aliphatic acid derivative and organic phosphorus compound incorporated in a synthetic oil in a proportion of from 0.5 to 10% by weight.

11. The rolling bearing according to claim 10, wherein the lubricant contains the at least one additive incorporated in the synthetic oil in a proportion of from 1.5 to 6% by weight.

* * * * *